(12) United States Patent
Yamazaki et al.

(10) Patent No.: US 9,284,465 B2
(45) Date of Patent: Mar. 15, 2016

(54) INK COMPOSITION FOR INK JET RECORDING

(71) Applicant: Seiko Epson Corporation, Tokyo (JP)

(72) Inventors: Soichi Yamazaki, Shiojiri (JP); Yoshitaka Miyajima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/582,345

(22) Filed: Dec. 24, 2014

(65) Prior Publication Data

US 2015/0175825 A1 Jun. 25, 2015

(30) Foreign Application Priority Data

Dec. 25, 2013 (JP) ................ 2013-267592

(51) Int. Cl.
| | |
|---|---|
| C09D 11/02 | (2014.01) |
| C09D 11/38 | (2014.01) |
| C08K 5/053 | (2006.01) |
| C08K 5/06 | (2006.01) |
| C08K 3/04 | (2006.01) |
| C08K 5/3437 | (2006.01) |
| C08K 5/23 | (2006.01) |
| C08K 5/3417 | (2006.01) |

(52) U.S. Cl.
CPC . *C09D 11/38* (2013.01); *C08K 3/04* (2013.01); *C08K 5/053* (2013.01); *C08K 5/06* (2013.01); *C08K 5/23* (2013.01); *C08K 5/3417* (2013.01); *C08K 5/3437* (2013.01)

(58) Field of Classification Search
CPC ................ C09D 11/30; C09D 11/38
See application file for complete search history.

(56) References Cited

U.S. PATENT DOCUMENTS

| | | | | |
|---|---|---|---|---|
| 6,153,001 | A * | 11/2000 | Suzuki et al. ............. | 106/31.65 |
| 6,890,378 | B2 * | 5/2005 | Yatake et al. ............. | 106/31.59 |
| 7,758,684 | B2 * | 7/2010 | Mizusaki et al. ......... | 106/31.59 |
| 2006/0047013 | A1 * | 3/2006 | Ito et al. ................... | 523/160 |
| 2007/0120928 | A1 | 5/2007 | Ma et al. | |
| 2009/0297712 | A1 * | 12/2009 | Kasahara et al. ......... | 427/256 |
| 2012/0320124 | A1 | 12/2012 | Saito et al. | |
| 2013/0057625 | A1 | 3/2013 | Yamazaki | |
| 2013/0115431 | A1 | 5/2013 | Aoyama et al. | |
| 2015/0085034 | A1 | 3/2015 | Aruga et al. | |

FOREIGN PATENT DOCUMENTS

| | | |
|---|---|---|
| EP | 1586612 A1 | 10/2005 |
| JP | 2013-018951 A | 1/2013 |
| WO | 2013/161410 A1 | 10/2013 |

OTHER PUBLICATIONS

Extended European Search Report for Application No. 14199834.4, dated May 8, 2015 (5 pages).

* cited by examiner

*Primary Examiner* — Veronica F Faison
(74) *Attorney, Agent, or Firm* — Nutter McClennen & Fish LLP; John J. Penny, Jr.

(57) ABSTRACT

An ink composition for ink jet recording according to the invention contains water, a coloring material, and three or more kinds of acetylene glycol-based surfactant selected from acetylene glycol represented by the following general formula (1) and an ethylene oxide adduct of acetylene glycol represented by the following general formula (2), and a total content of the acetylene glycol-based surfactant is 0.1% by mass to 3% by mass with respect to the total mass of the ink composition.

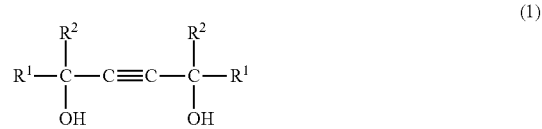

(1)

(In the general formula (1), each of $R^1$ and $R^2$ independently represents an alkyl group having 1 to 5 carbon atoms.)

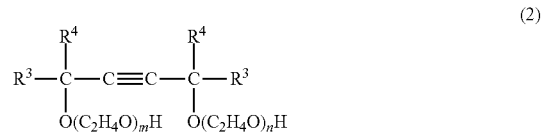

(2)

(In the general formula (2), each of $R^3$ and $R^4$ independently represents an alkyl group having 1 to 5 carbon atoms, each of m and n independently represents an integer of 0.5 to 25, and m+n is 1 to 40).

5 Claims, No Drawings

INK COMPOSITION FOR INK JET RECORDING

BACKGROUND

1. Technical Field

The present invention relates to an ink composition for ink jet recording.

2. Related Art

In the related art, an ink jet recording method for recording an image or text by fine ink droplets discharged from nozzles of a head for ink jet recording is known. As the ink composition used in such an ink jet recording method, an ink composition containing a coloring material (pigment, dye, or the like), a surfactant, water, an organic solvent, or the like is widely used.

Since the surfactant among components included in the ink composition for ink jet recording increases permeability and wetting and spreading properties of the ink composition with respect to a recording medium, the surfactant can improve an image quality of a recorded image. Among such surfactants, an acetylene glycol-based surfactant (for example, acetylene glycol and acetylene glycol derivatives) is attracting attention due to the fact that this surfactant is excellent in a function of improving the permeability and the wetting and spreading properties of the ink composition with respect to a recording medium and has an excellent defoaming property.

For example, JP-A-2013-18951 discloses an ink composition for ink jet recording which contains an acetylene glycol-based surfactant. JP-A-2013-18951 discloses an ink composition containing two kinds of ethylene oxide adduct of acetylene glycol having a specific structure and a HLB value, from the fact that an effect preventing reduction of a dot diameter is excellent while good discharging property is maintained.

In a case of recording an image on a recording medium (for example, plain paper of which a main component is cellulose) having favorable absorbability for ink (water) using the ink composition described in JP-A-2013-18951, the ink is likely to penetrate into the recording medium, and thus, an image with favorable image quality in which aggregation of ink droplets or color irregularity of an image is suppressed and favorable fixability tends to be obtained.

However, even in a case of recording an image on recycled paper among plain papers which have favorable absorbability of ink, aggregation of ink droplets or color irregularity of an image occurs on the recording medium, and due to this, the image quality deteriorates. Hydrophobic components such as inorganic compounds including calcium carbonate and kaolin, stearic acid, and resin in addition to cellulose are largely included in the recycled paper, and thus, a hydrophilic region and a hydrophobic region are mixed on the paper surface. For this reason, a problem in which penetration speed of an ink is different depending on the position to which ink droplets are adhered occurs, and deterioration of image quality such as aggregation or color irregularity occurs in some cases.

In addition, in a case of recording an image on a recording medium (for example, enamel paper such as art paper or coated paper) having low absorbability of ink (water) using the ink composition described in JP-A-2013-18951, the ink composition is less likely to penetrate into the recording medium, or less likely to wet and spread on the recording medium, and thus, due to occurrence of aggregation of ink droplets on the recording medium, color irregularity of the image, bleeding of the image (bleed) or the like, image quality deteriorates or fixability of an image deteriorates.

In this manner, it is difficult to record an image with favorable image quality and fixability on various types of recording medium having different absorbability of ink using the ink composition having one composition.

Furthermore, the ink composition of JP-A-2013-18951 has low permeability with respect to a recording medium having low absorbability of ink and does not exhibit sufficient penetration speed with respect to a recording medium having favorable absorbability of ink, and thus, time is required for promoting wetting and spreading or penetration of ink, and a recording speed of an image tends to decrease.

SUMMARY

An advantage of some aspects of the invention is to provide an ink composition for ink jet recording capable of recording an image with an excellent image quality and fixability on various types of recording medium at a high speed.

The invention can be realized as the following aspects or application examples.

Application Example 1

An aspect of the ink composition for ink jet recording according to the invention is an ink composition for ink jet recording which contains water, a coloring material, and three or more kinds of acetylene glycol-based surfactant selected from the group consisting of acetylene glycol represented by the following general formula (1) and an ethylene oxide adduct of acetylene glycol represented by the following general formula (2), and the total content of the acetylene glycol-based surfactant is 0.1% by mass to 3% by mass with respect to the total mass of the ink composition.

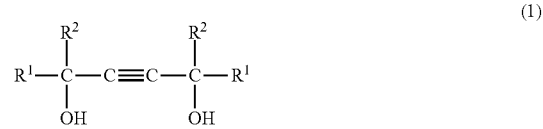

(In the general formula (1), each of $R^1$ and $R^2$ independently represents an alkyl group having 1 to 5 carbon atoms.)

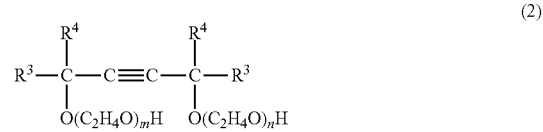

(In the general formula (2), each of $R^3$ and $R^4$ independently represents an alkyl group having 1 to 5 carbon atoms, each of m and n independently represents an integer of 0.5 to 25, and m+n is 1 to 40.)

According to the ink composition for ink jet recording according to Application Example 1, it is possible to record an image with excellent image quality and fixability at a high speed.

Application Example 2

According to Application Example 1, in a case where, among the acetylene glycol-based surfactants, a HLB value of a first acetylene glycol-based surfactant is defined as $h_1$, the HLB value of a second acetylene glycol-based surfactant is defined as $h_2$, and the HLB value of a third acetylene glycol-based surfactant is defined as $h_3$, the ink composition can satisfy all of the following formulas (A), (B), and (C).

$$h_1 < h_2 < h_3 \quad (A)$$

$$h_1 < 6 \quad (B)$$

$$10 < h_3 \quad (C)$$

Application Example 3

According to Application Example 1 or 2, the acetylene glycol-based surfactant can include one or more kinds of acetylene glycol represented by the above general formula (1) and two or more kinds of ethylene oxide adduct of acetylene glycol represented by the above general formula (2).

Application Example 4

According to any one of Application Examples 1 to 3, each content of three or more kinds of the acetylene glycol-based surfactant can be 5% by mass or greater and less than 50% by mass with respect to the total content of the acetylene glycol-based surfactant.

Application Example 5

According to Application Example 2, the ratio of the content of the first acetylene glycol-based surfactant, the content of the second acetylene glycol-based surfactant, and the content of the third acetylene glycol-based surfactant can be in a range of 3:1:1 to 1:1:1.

Application Example 6

According to any one of Application Examples 1 to 5, the ink composition can be used in an ink jet recording method for recording an image by adhering the ink composition discharged from a recording head on a recording medium while relatively moving the recording head with respect to the recording medium at a high speed of 0.5 m/s or greater.

DESCRIPTION OF EXEMPLARY EMBODIMENTS

Hereinafter, the preferable embodiments of the invention will be described. The embodiments described below merely describe an example of the invention. In addition, the invention is not limited to the following embodiments and includes various modifications performed within the range not departing from the scope of the invention.

1. Ink Composition

The ink composition according to an embodiment of the invention is an ink composition for ink jet recording which contains water, a coloring material, and three or more kinds of acetylene glycol-based surfactant selected from the group consisting of acetylene glycol represented by the following general formula (1) and an ethylene oxide adduct of acetylene glycol represented by the following general formula (2), and the total content of the acetylene glycol-based surfactant is 0.1% by mass to 3% by mass with respect to the total mass of the ink composition.

Hereinafter, components included and components which can be included in the ink composition according to the embodiment will be described.

1.1. Acetylene Glycol-Based Surfactant

The ink composition according to the embodiment contains three or more kinds of acetylene glycol-based surfactant selected from the group consisting of acetylene glycol represented by the following general formula (1) and an ethylene oxide adduct of acetylene glycol represented by the following general formula (2). Hereinafter, in the specification, "three or more kinds of acetylene glycol-based surfactant" indicates three or more kinds of acetylene glycol-based surfactant selected from the group consisting of the following general formula (1) and the following general formula (2).

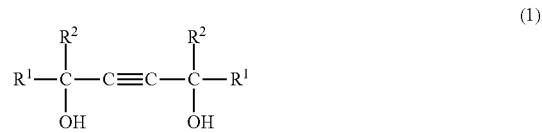

(1)

In the general formula (1), each of $R^1$ and $R^2$ independently represents an alkyl group having 1 to 5 carbon atoms. The alkyl group having 1 to 5 carbon atoms may have a linear structure or a branched structure. Specific examples of such an alkyl group include a methyl group, an ethyl group, an n-propyl group, an isopropyl group, an n-butyl group, an isobutyl group, a sec-butyl group, a tert-butyl group, a pentyl group, an isopentyl group, and a neopentyl group. $R^1$ and $R^2$ may be the same as or different from each other.

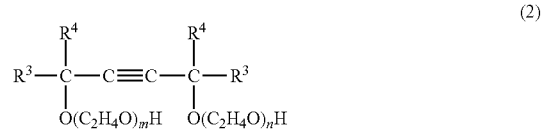

(2)

In the general formula (2), each of $R^3$ and $R^4$ independently represents an alkyl group having 1 to 5 carbon atoms, each of m and n independently represents an integer of 0.5 to 25, and m+n is 1 to 40. The alkyl group having 1 to 5 carbon atoms may have a linear structure or a branched structure. Specific examples of such an alkyl group include a methyl group, an ethyl group, an n-propyl group, an isopropyl group, an n-butyl group, an isobutyl group, a sec-butyl group, a tert-butyl group, a pentyl group, an isopentyl group, and a neopentyl group. $R^3$ and $R^4$ may be the same as or different from each other. In addition, m and n represent the addition molar number of ethylene oxide, and though m+n is required to be 1 to 40, m+n is preferably 10 to 30, and more preferably 15 to 25. In a case where m+n is greater than 40, static surface tension and dynamic surface tension are increased, and wettability is significantly decreased.

The present inventor has found that by using an ink composition containing three or more kinds of acetylene glycol-based surfactant having the specific structure described above, an excellent effect of an image with good image quality and fixability being able to be recorded on plural types of recording media having different absorbability of ink at a high speed can be exhibited. The mechanism by which such an effect can be exhibited is considered to result from the following reasons.

If plural surfactants having structures similar to each other are present in an ink, the arrangement of each surfactant is disturbed, and large micelles consisting of one surfactant are less likely to be formed, and thus, each surfactant is present as fine clusters. As a result, the moving speed of the ink composition with respect to the surface of a recording medium is improved, and the wettability and the permeability with respect to various recording media are improved. Thus, improvement in image quality and high-speed recording can be realized. Such a phenomenon is more significant when three or more kinds of acetylene glycol-based surfactant having structures similar to each other are present.

In addition, it is known that the penetration speed of an ink composition with respect to a recording medium is proportional to the value calculated from the formula represented by γ·cos θ (here, γ represents the surface tension of the ink composition, and θ represents the contact angle of the ink composition with respect to a recording medium). Here, fluorine-based surfactants or silicone-based surfactants widely used in an ink composition for ink jet recording have a small contact angle θ and also a low surface tension γ, and thus, improvement of the penetration speed of the ink composition cannot be expected. In contrast, acetylene glycol-based surfactants have a small contact angle and a high surface tension γ, and thus, the penetration speed of the ink composition can be improved, and improvement of image quality and fixability, and high-speed recording can be realized. Such an action is more significant when three or more kinds of acetylene glycol-based surfactant having structures similar to each other are present.

The image quality in this specification can be determined by the state of aggregation of ink droplets, color irregularity, bleed, and the like. Here, the aggregation of ink droplets refers to a phenomenon caused by binding with other ink drops after the ink droplets adhered to a recording medium flow before wetting and spreading. If the aggregation of ink droplets occurs in this manner, line irregularity in which portions that are not covered with ink droplets on the surface of a recording medium remain in a line shape or color irregularity formed on an image due to local irregular density spots occurs in some cases. In addition, "bleed (or bleeding)" refers to a state in which an image becomes blurred due to bleeding of a contour portion of an image recorded in a single color, or an image becomes blurred due to the result that one color adjacent between different colors is exuded and mixed with another color.

Specific examples of acetylene glycol represented by the above general formula (1) include 2,5,8,11-tetramethyl-6-dodecyne-5,8-diol, 5,8-dimethyl-6-dodecyne-5,8-diol, 2,4,7,9-tetramethyl-5-decyne-4,7-diol, 4,7-dimethyl-5-decyne-4,7-diol, 2,3,6,7-tetramethyl-4-octyne-3,6-diol, 3,6-dimethyl-4-octyne-3,6-diol, 3,6-diethyl-4-octyne-3,6-diol, and 2,5-dimethyl-3-hexyne-2,5-diol. In addition, as the acetylene glycol represented by the above general formula (1), commercially available products can be used, and examples thereof include Surfynol 82, 104, and DF-110 (hereinbefore, trade names, manufactured by Nissin Chemicals Co., Ltd.).

Specific examples of the ethylene oxide adduct of acetylene glycol represented by the above general formula (2) include ethylene oxide adducts of the compounds exemplified as specific examples of acetylene glycol represented by the above general formula (1). In addition, as the ethylene oxide adduct of acetylene glycol represented by the above general formula (2), commercially available products can be used, and examples thereof include Olfine E1004, E1010, E4300, and Surfynol 485 (hereinbefore, trade names, manufactured by Nissin Chemicals Co., Ltd.).

Three or more kinds of acetylene glycol-based surfactant preferably includes one or more kinds of acetylene glycol represented by the above general formula (1) and two or more kinds of ethylene oxide adduct of acetylene glycol represented by the above general formula (2). As a result, there is a tendency that effects derived from the above three or more kinds of acetylene glycol-based surfactant are further improved.

The total content of the three or more kinds of acetylene glycol-based surfactant is necessarily 0.1% by mass to 3% by mass, preferably 0.5% by mass to 2% by mass, and more preferably 1% by mass to 2% by mass with respect to the total mass of the ink composition. When the content of the three or more kinds of acetylene glycol-based surfactant is in the above range, the above effects are more favorably exhibited. In contrast, when the content is less than 0.1% by mass, deterioration of image quality or fixability tends to occur, and when the content is greater than 3% by mass, deterioration of image quality (in particular, occurrence of bleed) tends to occur.

Each content of the three or more kinds of acetylene glycol-based surfactant is preferably 5% by mass or greater and less than 50% by mass, and more preferably 10% by mass to 50% by mass with respect to the total content of the three or more kinds of acetylene glycol-based surfactant. When the content is in this numerical range, the mixing balance of three or more kinds of acetylene glycol-based surfactant becomes favorable, and thus, effects caused by three or more kinds of acetylene glycol-based surfactant being contained are further improved.

In a case where the HLB value of a first acetylene glycol-based surfactant among three or more kinds of acetylene glycol-based surfactant included in the ink composition according to the embodiment is defined as $h_1$, the HLB value of a second acetylene glycol-based surfactant is defined as $h_2$, and the HLB value of a third acetylene glycol-based surfactant is defined as $h_3$, the ink composition preferably satisfies all of the following formulas (A), (B), and (C).

$$h_1 < h_2 < h_3 \tag{A}$$

$$h_1 < 6 \tag{B}$$

$$10 \le h_3 \tag{C}$$

In this manner, by using the ink composition containing three or more kinds of acetylene glycol-based surfactant having HLB values different from each other, it is possible to record an image with excellent image quality and fixability on various types of recording medium such as a recording medium having high absorbability of ink or a recording medium having low absorbability of ink at a high speed using one ink composition. More specifically, by the first acetylene glycol which is lipophilic being contained, an effect of wetting and spreading properties with respect to a recording medium having low absorbability of ink is favorably exhibited, and by containing the third acetylene glycol which is hydrophilic, an effect of wetting and spreading properties with respect to a recording medium having high absorbability of ink is favorably exhibited. Furthermore, since by containing the second acetylene glycol-based surfactant having a HLB value between the first acetylene glycol-based surfactant and the second acetylene glycol-based surfactant, compatibility between the first acetylene glycol-based surfactant and the third acetylene glycol-based surfactant becomes favorable, it is possible to make a discharging property be favorable in high-speed printing. In this manner, the above effect caused by containing three or more kinds of acetylene glycol-based surfactant are obtained.

Three or more kinds of acetylene glycol-based surfactant included in the ink composition according to the embodiment satisfy the above-described formulas (A) to (C), and the HLB value ($h_2$) of the second acetylene glycol-based surfactant is preferably 7 to 12 (that is, $7 \leq h_2 \leq 12$), and more preferably 8 to 12 (that is, $8 \leq h_2 \leq 12$). Since, due to this, the balance between the HLB values of the three or more kinds of acetylene glycol-based surfactant included in the ink composition becomes favorable, image quality, fixability, and a high-speed recording property with respect to various types of recording medium tend to be further improved.

Though the HLB value ($h_1$) of the first acetylene glycol-based surfactant is preferably less than 6 as shown in the above formula (B), from the viewpoint of improving dispersibility in an ink of the first acetylene glycol-based surfactant, the HLB value is more preferably 1 or greater and less than 6 (that is, $1 \leq h_1 < 6$), and still more preferably 3 or greater and less than 6 (that is, $3 \leq h_1 < 6$).

Though the HLB value ($h_3$) of the third acetylene glycol-based surfactant is preferably 10 or greater as shown in the above formula (C), from the viewpoint of further improving permeability with respect to a recording medium having high absorbability of ink while maintaining favorable miscibility between the third acetylene glycol-based surfactant and another surfactant, the HLB value is more preferably 10 to 20 (that is, $10 \leq h_3 < 20$), and still more preferably 12 to 18 (that is, $12 \leq h_3 < 18$).

The HLB value in the invention is a value for evaluating hydrophilicity of compounds proposed by Davies et al., a numerical value determined by Davies' method defined in, for example, the document "J. T. Davies and E. K. Rideal, "Interface Phenomena", 2nd Ed. Academic Press, New York 1963", and a value calculated according to the following formula (i).

HLB value=$7+\Sigma[1]+\Sigma[2]$      (i)

(In the formula (i), [1] represents a cardinal number of a hydrophilic group, and [2] represents a cardinal number of a hydrophobic group.)

In a case where the content of the first acetylene glycol-based surfactant with respect to the total mass (100% by mass) of the ink composition is defined as $W_1$% by mass, the content of the second acetylene glycol-based surfactant is defined as $W_2$% by mass, and the content of the third acetylene glycol-based surfactant is defined as $W_3$% by mass, this ratio ($W_1:W_2:W_3$) is preferably in a range of 3:1:1 to 1:1:1. When the content is in the numerical range, the mixing balance of the three or more kinds of acetylene glycol-based surfactant becomes favorable, and thus, effects caused by containing the three or more kinds of acetylene glycol-based surfactant are further improved.

The three or more kinds of acetylene glycol-based surfactant preferably includes one or more kinds of acetylene glycol which do not transparently dissolve when added to water so as to have a concentration of 1%, one or more kinds of ethylene oxide adduct of acetylene glycol which do not transparently dissolve when added to water so as to have a concentration of 1%, and one or more kinds of ethylene oxide adduct of acetylene glycol which transparently dissolve when added to water so as to have a concentration of 1%. As a result, there is a tendency that effects derived from the above three or more kinds of acetylene glycol-based surfactant are further improved.

the solubility of an acetylene glycol-based surfactant in water can be determined based on light transmittance of a mixed liquid of an acetylene glycol-based surfactant and water, and a mixed liquid having light transmittance of 90% or greater is described as "transparently dissolve", and a mixed liquid having a light transmittance of less than 90% is described as "does not transparently dissolve". The mixed liquid is prepared by stirring to mix for 10 minutes or more after an acetylene glycol-based surfactant is added to water so as to have a concentration of 1%. In addition, a light transmittance, using a spectrophotometer, can be measured using a quartz cell having an optical path length of 1 cm. Examples of the spectrophotometer used in this measurement include U-3900 (trade name) manufactured by Hitachi High-Technologies Corporation.

1.2. Coloring Material

The ink composition according to the embodiment contains a color material. As the coloring material, dyes and organic or inorganic pigments known in the related art can be used. Among these, pigments are preferably used from the viewpoint of light resistance.

Among pigments, examples of the inorganic pigment include carbon black, iron oxide, and titanium oxide. Examples of the organic pigment include a quinacridone pigment, a quinacridonequinone pigment, a dioxazine pigment, a phthalocyanine pigment, an anthrapyrimidine pigment, an anthanthrone pigment, an indanthrone pigment, a flavanthrone pigment, a perylene pigment, a diketopyrrolopyrrole pigment, a perinone pigment, a quinophthalone pigment, an anthraquinone pigment, a thioindigo pigment, a benzimidazolone pigment, an isoindolinone pigment, an azomethine pigment, and an azo pigment. In addition, in the ink composition of the embodiment, a glitter pigment such as metal particles, metal flakes, or mineral salts may be used as a coloring material.

The content of the coloring material in the ink composition of the embodiment, which is not particularly limited, is preferably 0.01% by mass to 25% by mass, more preferably 0.1% by mass to 10% by mass, still more preferably 0.5% by mass to 15% by mass, and particularly preferably 1% by mass to 10% by mass with respect to the total mass of the ink composition.

In order to apply the pigment to the ink composition, it is preferable that the pigment be stably dispersed and held in water. Examples of a method include a method for dispersing in a pigment dispersed resin such as a water-soluble resin and/or a water-dispersible resin (hereinafter, a pigment treated according to this method is also referred to as "resin-dispersed pigment"), a method for dispersing in a dispersant (hereinafter, a pigment treated according to this method is also referred to as "dispersant-dispersed pigment"), and a method chemically and physically introducing a hydrophilic functional group to the pigment particle surface and enabling the pigment to be dispersible and/or soluble in water without the resin or a dispersant (hereinafter, a pigment treated according to this method is also referred to as "surface treated pigment"). The ink composition according to the embodiment can utilize any of the resin-dispersed pigment, the dispersant-dispersed pigment, and the surface treated pigment, and these can also be used in the form of a plurality of kinds mixed together as necessary.

Examples of the pigment-dispersed resin used in the resin-dispersed pigment include polyvinyl alcohols, a polyacrylic acid, an acrylic acid-acrylonitrile copolymer, a vinyl acetate-acrylic acid ester copolymer, an acrylic acid-acrylic acid ester copolymer, a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, a styrene-maleic acid copolymer, a styrene-maleic anhydride copolymer, a vinyl naphthalene-acrylic acid copolymer, a vinyl naphthalene-maleic acid copolymer, a vinyl acetate-maleic acid ester copolymer, a vinyl acetate-crotonic acid copolymer, a vinyl acetate-acrylic acid copolymer, and salts thereof. Among these, a copolymer of a monomer having a hydrophobic functional group and a monomer having a hydrophilic functional group, and a polymer formed from monomers having both a hydrophobic functional group and a hydrophilic functional group are preferable. As the form of the copolymer, it is possible to use any form of a random copolymer, a block copolymer, an alternating copolymer, and a graft copolymer. As such a pigment-dispersed resin, commercially available products can be used, and examples thereof include Solsperse 20000, 24000, 32000, 32500, 33500, 34000, 35200, and 37500 (hereinbefore, manufactured by Lubrizol Corp.), Disperbyk-161, 162, 163, 164, 166, 180, 190, 191, and 192 (hereinbefore, manufactured by BYK Co., Ltd.), FLOWLEN DOPA-17, 22, 33, and G-700 (hereinbefore, manufactured by Kyoeisha Chemical Co., Ltd.), AJISPUR PB821 and PB711 (hereinbefore, manufactured by Ajinomoto Fine Techno Co., Inc.), and LP4010, LP4050, LP4055, POLYMER400, 401, 402, 403, 450, 451, and 453 (hereinbefore, manufactured by EFKA).

The content proportion of the pigment-dispersed resin can be suitably selected depending on a pigment to be dispersed, and the content is preferably 5 parts by mass to 200 parts by mass, and more preferably 30 parts by mass to 120 parts by mass with respect to 100 parts by mass of the content of the pigment in the ink composition.

1.3. Water

The ink composition according to the embodiment contains water. The water is preferably water in which ionic impurities have been removed as much as possible, such as pure water or ultrapure water including ion exchange water, ultrafiltration water, reverse osmosis water, or distilled water. In addition, when using water sterilized using an ultraviolet ray irradiation or adding hydrogen peroxide, it is possible to prevent generation of fungi or bacteria in a case where the ink is stored for a long period of time, and thus, using sterilized water is preferable. The content of water, for example, can be 50% by mass or greater with respect to the total mass of the ink composition.

1.4. Other Components

The ink composition according to the embodiment may contain an organic solvent, a resin, surfactants (hereinafter, also referred to as "other surfactants") other than acetylene glycol-based surfactants having the specific structure, a pH adjusting agent, a preservative, a fungicide, an antirust agent, and a chelating agent.

1.4.1. Organic Solvent

Examples of the organic solvent, which are not particularly limited, include 1,2-alkanediols, polyols, pyrrolidone derivatives, and glycol ethers.

Examples of the 1,2-alkanediols include 1,2-propanediol, 1,2-butanediol, 1,2-pentanediol, 1,2-hexanediol, and 1,2-octanediol. Since 1,2-alkanediols increase the wettability of an ink composition with respect to a recording medium, 1,2-alkanediols are excellent in uniformly wetting. In a case where 1,2-alkanediols are contained, the content can be 1% by mass to 20% by mass with respect to the total mass of the ink composition.

Examples of the polyols include ethylene glycol, diethylene glycol, propylene glycol, dipropylene glycol, 1,3-propanediol, 1,4-butanediol, 1,6-hexanediol, trimethylolpropane, and glycerin. Polyols have a function of increasing the wettability of the ink composition with respect to a recording medium or increasing a moisture retaining property of the nozzles of a recording head. In a case where polyols are contained, the content can be 2% by mass to 30% by mass with respect to the total mass of the ink composition.

Examples of the pyrrolidone derivatives include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. The pyrrolidone derivatives can act as a favorable solubilizer for a resin. In a case where a pyrrolidone derivative is contained, the content can be 0.5% by mass to 6% by mass with respect to the total mass of the ink composition.

Examples of the glycol ethers include ethylene glycol monoisobutyl ether, ethylene glycol monohexyl ether, ethylene glycol monoisohexyl ether, diethylene glycol monohexyl ether, triethylene glycol monobutyl ether, monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-ethylhexyl ether, diethylene glycol mono-2-ethylhexyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether. These can be used alone or in a mixture of two or more kinds thereof. Glycol ethers can control the wettability of the ink composition with respect to a recording medium. In a case where glycol ethers are contained, the content can be 0.5% by mass to 6% by mass with respect to the total mass of the ink composition.

1.4.2. Resin

A resin has a function of improving the fixability of the ink composition. Example of the resin include an acrylic resin, a fluorene-based resin, a urethane-based resin, an olefin-based resin, a rosin-modified resin, a terpene-based resin, an ester-based resin, an amide-based resin, an epoxy-based resin, a vinyl chloride-based resin, a vinyl chloride-vinyl acetate copolymer, and an ethylene vinyl acetate-based resin. These resins may be used alone or in combination of two or more kinds thereof. As the resin, an emulsion type resin may be used, or a liquid type resin may be used. In a case where the resin is contained, the content can be 0.1% by mass to 6% by mass.

1.4.3. Other Surfactants

The ink composition according to the embodiment may contain other surfactants (surfactants other than acetylene glycol-based surfactants having the specific structure). As such a surfactant, an acetylene glycol-based surfactant which does not correspond to the above general formula (1) or (2), a silicone-based surfactant, and a fluorine-based surfactant can be exemplified.

1.4.4. pH Adjusting Agent, Preservative, Fungicide, Antirust Agent, and Chelating Agent Examples of the pH adjusting agent include Good's buffers such as potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium hydrogen carbonate, trishydroxymethylaminomethane (THAM), 4-(2-hydroxyethyl)-1-piperazineethanesulfonic acid (HEPES), morpholinoethanesulfonic acid (MES), carbamoylmethyliminobisacetic acid (ADA), piperazine-1,4-bis(2-ethanesulfonic acid) (PIPES), N-(2-acetamido)-2-aminoethanesulfonic acid (ACES), cholamine chloride, N,N-bis(2-hydroxyethyl)-2-aminoethanesulfonic acid (BES), N-tris(hydroxymethyl)methyl-2-aminoethanesulfonic acid (TES), acetamidoglycine, tricine, glycine amide, and bicine, a phosphate buffer solution, and a Tris buffer.

Examples of the preservative and the fungicide include sodium benzoate, sodium pentachlorophenol, sodium 2-pyridinethiol-1-oxide, sodium sorbate, sodium dehydroacetate, 1,2-dibenzisothiazolin-3-one (Proxel CRL, Proxel BDN, Proxel GXL, Proxel XL.2, Proxel TN, and Proxel LV manufactured by Zeneca Co., Ltd.), and 4-chloro-3-methylphenol (Preventol CMK manufactured by BAYER).

Examples of the anticorrosive agent include benzotriazole and the like.

Examples of the chelating agent include ethylenediaminetetraacetic acid and salts thereof (disodium dihydrogen ethylenediaminetetraacetate and the like).

1.5. Method for Preparing Ink Composition

The ink composition according to the embodiment can be obtained by mixing the above-described components in an arbitrary order and removing impurities by filtration or the like as necessary. As the method for mixing in each component, a method for stirring and mixing materials by sequentially adding the materials to a container equipped with a stirrer such as a mechanical stirrer or a magnetic stirrer is preferably used. As the filtration method, a centrifugal filtration or a filter filtration can be performed as necessary.

1.6. Physical Properties

The surface tension of the ink composition according to the embodiment at a temperature of 20° C. is preferably 20 mN/m to 40 mN/m, and more preferably 25 mN/m to 35 mN/m from the viewpoint of balance between the image quality and the reliability as the ink composition for ink jet recording. Moreover, the surface tension can be measured by checking the surface tension at the time of wetting a platinum plate with an ink in the environment of a temperature of 20° C. using an Automatic Surface Tension Analyzer CBVP-Z (trade name, manufactured by Kyowa Interface Science Co., Ltd.).

In addition, from the same viewpoint, the viscosity of the ink composition according to the embodiment at a temperature of 20° C. is preferably 1.5 mPa·s to 10 mPa·s, and more preferably 2 mPa·s to 8 mPa·s. Moreover, the measurement of the viscosity can be performed by measuring the viscosity in an environment of a temperature of 20° C. using a viscoelasticity tester MCR-300 (trade name, manufactured by Physica Co., Ltd.).

2. Ink Set

The ink set according to an embodiment of the invention includes plural ink compositions of which hues are different from each other, and at least one ink composition among the plural ink compositions is the ink composition described above (that is, an ink composition containing water, a coloring material, and three or more kinds of acetylene glycol-based surfactant having a specific structure in the range of 0.1% by mass to 3% by mass).

As the plural ink compositions having different hue, a yellow ink, a magenta ink, a cyan ink can be exemplified, and a black ink or the like may be further used.

The yellow ink refers to an ink that can record an image exhibiting a yellow color when the ink is adhered on a recording medium (for example, "Photo paper (gloss)" (trade name) manufactured by Seiko Epson Corporation), and usually, an ink containing a yellow-based coloring material. Here, the yellow color refers to a yellow color of which a hue angle h defined in CIELAB color space is 80° to 100°. As lightness and chroma of the yellow color, lightness $L^*$ is preferably 70 to 100, and chroma $C^*$ is preferably 55 to 90. Examples of the yellow-based coloring material include yellow-based pigments such as C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 111, 113, 114, 117, 120, 124, 128, 129, 133, 138, 139, 147, 150, 151, 153, 154, 155, 167, 172, 180, 185, and 213, however, the invention is not limited thereto. These pigments may be used alone or in combination of two or more kinds thereof.

The magenta ink refers to an ink that can record an image exhibiting a magenta color when the ink is adhered on a recording medium (for example, "Photo paper (gloss)" (trade name) manufactured by Seiko Epson Corporation), and usually, an ink containing a magenta-based coloring material. Here, the magenta color refers to a magenta color of which a hue angle h defined in CIELAB color space is 330° to 360°. As lightness and chroma of the magenta color, lightness $L^*$ is preferably 40 to 70, and chroma $C^*$ is preferably 60 to 100. Examples of the magenta-based coloring material include magenta-based pigments such as C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 264, C. I. Pigment Violet 19, 23, 32, 33, 36, 38, 43, and 50, however, the invention is not limited thereto. These pigments may be used alone or in combination of two or more kinds thereof.

The cyan ink refers to an ink that can record an image exhibiting a cyan color when the ink is adhered on a recording medium (for example, "Photo paper (gloss)" (trade name) manufactured by Seiko Epson Corporation), and usually, an ink containing a cyan-based coloring material. Here, the cyan color refers to a cyan color of which a hue angle h defined in CIELAB color space is 230° to 260°. As lightness and chroma of the cyan color, lightness $L^*$ is preferably 50 to 85, and chroma $C^*$ is preferably 40 to 80. Examples of the cyan-based coloring material include cyan-based pigments such as C. I. Pigment Blue 1, 2, 3, 15, 15:1, 15:2, 15:3, 15:3, 15:4, 15:6, 15:34, 16, 18, 22, 25, 60, 65, and 66, however, the invention is not limited thereto. These pigments may be used alone or in combination of two or more kinds thereof.

The black ink refers to an ink that can record an image exhibiting a black color when the ink is adhered on a recording medium (for example, "Photo paper (gloss)" (trade name) manufactured by Seiko Epson Corporation), and usually, an ink containing a black-based coloring material. The black color refers to a black color of which lightness $L^*$ defined in CIELAB color space is 50 or less, and chroma $C^*$ defined in CIELAB color space is 15 or less. Examples of the black-based coloring material, which is not particularly limited, include black-based pigments represented by carbon blacks (C. I. Pigment Black 7) such as a furnace black, a lamp black, an acetylene black, and a channel black. More specifically, examples of the black-based pigment include No. 2300, No. 900, MCF88, No. 33, No. 40, No. 45, No. 52, MA7, MA8, MA100, or No. 2200B manufactured by Mitsubishi Chemical Corporation; Raven 5750, Raven 5250, Raven 5000, Raven 3500, Raven 1255, or Raven 700 manufactured by Columbia carbon Ltd.; Regal 400R, Regal 330R, Regal 660R, Mogul L, Monarch 700, Monarch 800, Monarch 880, Monarch 900, Monarch 1000, Monarch 1100, Monarch 1300, or Monarch 1400 manufactured by Cabot Corporation; or Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, or Special Black 4 manufactured by Degussa. These pigments may be used alone or in combination of two or more kinds thereof.

A more preferable aspect of the ink set according to the embodiment is an aspect in which the above-described ink composition included in an ink set is a yellow ink. In an image to be recorded using a yellow ink, bleed (in particular, bleed at the boundary portion with other color inks) is likely to be conspicuous compared to an image to be recorded using other color inks (cyan ink, magenta ink, and the like). Therefore, it is preferable from the viewpoint that by applying the mixing shown in the above-described ink composition to a yellow ink, an image in which bleed is suppressed is obtained.

A still more preferable aspect of the ink set according to the embodiment is an aspect in which the above-described ink composition included in an ink set is a yellow ink and a black ink. In an image recorded using a black ink, bleed (in particular, bleed at the boundary portion with a yellow ink) is likely to be conspicuous as a yellow ink. Therefore, it is preferable from the viewpoint that by applying the mixing shown in the above-described ink composition to a black ink in addition to a yellow ink, an image in which bleed is suppressed is obtained.

Moreover, all the ink compositions included in the ink set may be ink compositions to which the mixing in the above-described ink composition is applied.

3. Ink Jet Recording Method

The ink jet recording method according to an embodiment of the invention is a method in which using the ink composition or the ink set described above, ink droplets of the ink composition are discharged, and the ink droplets are adhered to a recording medium, whereby an image is recorded. As a result, a recorded matter in which an image is formed on a recording medium is obtained. In the ink jet recording method according to the embodiment, the above-described ink composition is used, and thus, it is possible to record an image with excellent image quality and fixability at a high speed on various recording media.

The ink jet recording method according to the embodiment is performed using an ink jet recording apparatus (for example, a known ink jet printer). As such an ink droplet discharging apparatus, it is possible to use any one of a so-called serial-type ink jet recording apparatus (printer which adopts a serial head as a recording head) and a line-type ink jet recording apparatus (printer which adopts a line head as a recording head). In either type of these ink jet recording apparatuses, a recording head is mounted, and it is possible to record a predetermined image by ink droplets of the ink composition being discharged at a predetermined timing and with a predetermined volume (mass) from the nozzles of the recording head while the relative positional relationship between the recording medium and the recording head is changed, and the ink composition being adhered to the recording medium.

Here, a recording speed when recording an image on a recording medium is improved by increasing a relative moving speed of a recording head with respect to the recording medium. Since the above-described ink composition has excellent permeability, and wetting and spreading properties with respect to various recording medium, even in a case where the relative moving speed of a recording head with respect to a recording medium is a high speed of 0.5 m/s or greater (preferably, 0.5 m/s to 3 m/s), it is possible to record an image with excellent image quality and fixability.

The ink jet recording method can utilize the above-described serial-type or line-type ink jet recording device, however, the method is not particularly limited as long as it enables ink droplets to be adhered to a recording medium by the ink composition being discharged as ink droplets from minute nozzles. For example, examples of the ink jet recording method include an electrostatic suction method, a method in which ink droplets are discharged by the pressure of a pump, a method using a piezoelectric element, and a method in which an ink liquid is heated and caused to bubble by minute electrodes, thereby causing ink droplets to be discharged. Among these, a method using a piezoelectric element can be preferably used.

Since the ink jet recording method according to the embodiment uses the above-described ink composition or ink set, it is possible to record an image with excellent image quality and fixability at a high speed on various recording media. As such a recording medium, a recording medium having high absorbability of ink or a recording medium having low absorbability of ink can be exemplified.

Usually, in a case of performing ink jet recording on a recording medium having low absorbability of ink, wetting and spreading properties and permeability of the ink composition are low, and thus, in order to record an image with favorable image quality, the recorded image is required to be dried using a drying apparatus such as a heater. However, since the above-described ink composition has excellent wetting and spreading properties and permeability of an ink with respect to a recording medium having low absorbability of ink, in some cases, the drying step using a drying apparatus such as a heater can be omitted. As a result, a problem such as an increase in size or an increase in power consumption of an apparatus due to introduction of a drying apparatus can be solved, and it is possible to realize high-speed image recording due to omission of the drying step.

Examples of the recording medium having high absorbability of ink, which is not particularly limited, include plain paper such as electrophotographic paper in which penetrability of an aqueous ink is high, and ink jet printing paper (paper used exclusively for an ink jet provided with an ink absorbing layer constituted with silica particles or alumina particles, or an ink absorbing layer constituted with a hydrophilic polymer such as polyvinyl alcohol (PVA) or polyvinyl pyrrolidone (PVP)).

Examples of the recording medium having low absorbability of ink, which is not particularly limited, include enamel paper in which a coating layer for receiving the ink on the surface is provided, and examples thereof include printing paper such as art paper used in general offset printing having relatively low permeability of an aqueous ink, coated paper, matte paper, and the like.

4. Examples

Hereinafter, the embodiments of the invention will be further specifically described with reference to examples, but the embodiments are not limited to these examples.

4.1. Preparation of Ink Composition

Respective materials shown in Table 1 were introduced into a container, mixing and stirring was performed for 2 hours using a magnetic stirrer, and filtration was performed using a membrane filter with a hole diameter of 5 μm to remove impurities such as dust or coarse particles, whereby the respective ink compositions according to Examples and Comparative Examples were prepared. Moreover, in Examples and Comparative Examples, four ink compositions (yellow ink, magenta ink, cyan ink, and black ink) in which only the kind of coloring material was changed were produced, and evaluation was performed on each of the four ink compositions. Here, the bleed test was performed using a yellow ink and a black ink.

Moreover, in Table 1, the materials described other than the compound names are as follows.

Surfynol 104 (trade name, manufactured by Nissin Chemicals Co., Ltd., acetylene glycol corresponding to the above formula (1), 2,4,7,9-tetramethyl-5-decyne-4,7-diol, HLB value: 4)

Surfynol 82 (trade name, manufactured by Nissin Chemicals Co., Ltd., acetylene glycol corresponding to the above formula (1), HLB value: 4)

Olfine E1004 (trade name, manufactured by Nissin Chemicals Co., Ltd., ethylene oxide adduct of acetylene glycol corresponding to the above formula (2), HLB value: 8)

Olfine E4300 (trade name, manufactured by Nissin Chemical Industry Co., Ltd., ethylene oxide adduct of acetylene glycol corresponding to the above formula (2), HLB value: 11)

Olfine E1010 (trade name, manufactured by Nissin Chemicals Co., Ltd., ethylene oxide adduct of acetylene glycol corresponding to the above formula (2), ethylene oxide adduct of 2,4,7,9-tetramethyl-5-decyne-4,7-diol (addition molar number of ethylene oxide: 10), HLB value: 13)

Surfynol 485 (trade name, manufactured by Nissin Chemicals Co., Ltd., ethylene oxide adduct of acetylene glycol corresponding to the above formula (2), ethylene oxide adduct of 2,4,7,9-tetramethyl-5-decyne-4,7-diol (addition molar number of ethylene oxide: 30), HLB value: 17)

NOIGEN ET-116B (trade name, manufactured by Dai-ichi Kogyo Seiyaku Co., Ltd., polyoxyalkylene alkyl ether, HLB value: 12)

BYK-348 (trade name, manufactured by BYK-Chemie Japan K.K., silicone-based surfactant, HLB value: 11)

Pigment (to each ink composition, carbon black (for black ink), C. I. Pigment Blue 15:4 (for cyan ink), C. I. Pigment Red 122 (for magenta ink), or C. I. Pigment Yellow 74 (for yellow ink) was used)

Styrene acrylic acid copolymer (trade name "JONCRYL390", manufactured by BASF Japan Co., Ltd., glass transition temperature (Tg): −5° C., weight average molecular weight: greater than 200,000)

TABLE 1

| | Ink composition | | | | | | | | |
|---|---|---|---|---|---|---|---|---|---|
| | Surfactant | | | | | | | | |
| | Acetylene glycol-based surfactant | | | | | | Polyoxyalkylenealkyl ether | Silicone-based Surfactant | |
| | Surfynol 104 (HLB value: 4) | Surfynol 82 (HLB value: 4) | Olfine E1004 (HLB value: 8) | Olfine E4300 (HLB value: 11) | Olfine E1010 (HLB value: 13) | Surfynol 485 (HLB value: 17) | NOIGEN ET116B (HLB value: 12) | BYK348 (HLB value: 11) | Pigment |
| Example 1 | 0.4 | | | 0.4 | | 0.4 | | | 6 |
| Example 2 | 0.5 | | | 0.2 | 0.5 | | | | 6 |
| Example 3 | 0.4 | | 0.4 | 0.4 | | | | | 6 |
| Example 4 | | 0.5 | | 0.2 | | 0.5 | | | 6 |
| Example 5 | 0.1 | | | 0.5 | 0.6 | | | | 6 |
| Example 6 | | 0.6 | | 0.5 | | 0.2 | | | 6 |
| Example 7 | 0.6 | | 0.05 | | | 0.55 | | | 6 |
| Example 8 | 0.6 | | | 0.05 | 0.55 | | | | 6 |
| Example 9 | 0.05 | | | 0.55 | | 0.6 | | | 6 |
| Example 10 | 0.04 | | | 0.02 | 0.04 | | | | 6 |
| Example 11 | 0.8 | | | 0.8 | 0.8 | | | | 6 |
| Comparative Example 1 | 0.55 | | | | | | 0.45 | | 6 |
| Comparative Example 2 | 0.4 | | | | 0.4 | | | 0.6 | 6 |
| Comparative Example 3 | 0.6 | | | | | | | | 6 |
| Comparative Example 4 | | | | 0.6 | | | | | 6 |
| Comparative Example 5 | | | | | | | 0.6 | | 6 |
| Comparative Example 6 | 0.6 | | 0.6 | | | | | | 6 |
| Comparative Example 7 | | 0.6 | | 0.6 | | | | | 6 |
| Comparative Example 8 | 0.6 | | | | 0.6 | | | | 6 |
| Comparative Example 9 | | 0.6 | | | | 0.6 | | | 6 |
| Comparative Example 10 | | | | 0.6 | 0.6 | | | | 6 |
| Comparative Example 11 | | | | 0.6 | | 0.6 | | | 6 |
| Comparative Example 12 | 0.03 | | | 0.03 | | 0.03 | | | 6 |
| Comparative Example 13 | 1 | | | 1 | 2 | | | | 6 |

TABLE 1-continued

| | Ink composition | | | | | | | |
|---|---|---|---|---|---|---|---|---|
| | Glycerin | 1,2-Hexanediol | Triethyleneglycol monobutyl ether | 2-pyrrolidone | Tripropanol amine | Styrene acrylic acid copolymer | Ion exchange water | Total (% by mass) |
| Example 1 | 15 | 3 | 2 | 5 | 0.5 | 2 | 65.3 | 100 |
| Example 2 | 15 | 3 | 2 | 5 | 0.5 | 2 | 65.3 | 100 |
| Example 3 | 15 | 3 | 2 | 5 | 0.5 | 2 | 65.3 | 100 |
| Example 4 | 15 | 3 | 2 | 5 | 0.5 | 2 | 65.3 | 100 |
| Example 5 | 15 | 3 | 2 | 5 | 0.5 | 2 | 65.3 | 100 |
| Example 6 | 15 | 3 | 2 | 5 | 0.5 | 2 | 65.2 | 100 |
| Example 7 | 15 | 3 | 2 | 5 | 0.5 | 2 | 65.3 | 100 |
| Example 8 | 15 | 3 | 2 | 5 | 0.5 | 2 | 65.3 | 100 |
| Example 9 | 15 | 3 | 2 | 5 | 0.5 | 2 | 65.3 | 100 |
| Example 10 | 15 | 3 | 2 | 5 | 0.5 | 2 | 66.4 | 100 |
| Example 11 | 15 | 3 | 2 | 5 | 0.5 | 2 | 64.1 | 100 |
| Comparative Example 1 | 15 | 3 | 2 | 5 | 0.5 | 2 | 65.5 | 100 |
| Comparative Example 2 | 15 | 3 | 2 | 5 | 0.5 | 2 | 65.1 | 100 |
| Comparative Example 3 | 15 | 3 | 2 | 5 | 0.5 | 2 | 65.9 | 100 |
| Comparative Example 4 | 15 | 3 | 2 | 5 | 0.5 | 2 | 65.9 | 100 |
| Comparative Example 5 | 15 | 3 | 2 | 5 | 0.5 | 2 | 65.9 | 100 |
| Comparative Example 6 | 15 | 3 | 2 | 5 | 0.5 | 2 | 65.3 | 100 |
| Comparative Example 7 | 15 | 3 | 2 | 5 | 0.5 | 2 | 65.3 | 100 |
| Comparative Example 8 | 15 | 3 | 2 | 5 | 0.5 | 2 | 65.3 | 100 |
| Comparative Example 9 | 15 | 3 | 2 | 5 | 0.5 | 2 | 65.3 | 100 |
| Comparative Example 10 | 15 | 3 | 2 | 5 | 0.5 | 2 | 65.3 | 100 |
| Comparative Example 11 | 15 | 3 | 2 | 5 | 0.5 | 2 | 65.3 | 100 |
| Comparative Example 12 | 15 | 3 | 2 | 5 | 0.5 | 2 | 66.41 | 100 |
| Comparative Example 13 | 15 | 3 | 2 | 5 | 0.5 | 2 | 62.5 | 100 |

| | Mixing ratio of each acetylene glycol-based surfactant and total of the content | | | | | | |
|---|---|---|---|---|---|---|---|
| | Surfynol 104 (HLB value: 4) (%) | Surfynol 82 (HLB value: 4) (%) | Olfine E1004 (HLB value: 8) (%) | Olfine E4300 (HLB value: 11) (%) | Olfine E1010 (HLB value: 13) (%) | Surfynol 485 (HLB value: 17) (%) | Total amount with respect to ink composition (% by mass) |
| Example 1 | 33.3 | | | 33.3 | | 33.3 | 1.2 |
| Example 2 | 41.7 | | | 16.7 | 41.7 | | 1.2 |
| Example 3 | 33.3 | | 33.3 | 33.3 | | | 1.2 |
| Example 4 | | 41.7 | | 16.7 | | 41.7 | 1.2 |
| Example 5 | 8.3 | | | 41.7 | 50.0 | | 1.2 |
| Example 6 | | 46.2 | | 38.5 | | 15.4 | 1.3 |
| Example 7 | 50.0 | | 4.2 | | | 45.8 | 1.2 |
| Example 8 | 50.0 | | | 4.2 | 45.8 | | 1.2 |
| Example 9 | 4.2 | | | 45.8 | | 50.0 | 1.2 |
| Example 10 | 40.0 | | | 20.0 | | 40.0 | 0.1 |
| Example 11 | 33.3 | | | 33.3 | 33.3 | | 2.4 |
| Comparative Example 1 | 100.0 | | | | | | 0.55 |
| Comparative Example 2 | 50.0 | | | | | 50.0 | 0.8 |
| Comparative Example 3 | 100.0 | | | | | | 0.6 |
| Comparative Example 4 | | | | 100.0 | | | 0.6 |
| Comparative Example 5 | | | | | | 100.0 | 0.6 |
| Comparative Example 6 | 50.0 | | 50.0 | | | | 1.2 |
| Comparative Example 7 | | 50.0 | | 50.0 | | | 1.2 |

TABLE 1-continued

|  |  |  |  |  |  |
|---|---|---|---|---|---|
| Comparative Example 8 | 50.0 |  |  | 50.0 | 1.2 |
| Comparative Example 9 |  | 50.0 |  | 50.0 | 1.2 |
| Comparative Example 10 |  |  | 50.0 | 50.0 | 1.2 |
| Comparative Example 11 |  |  | 50.0 | 50.0 | 1.2 |
| Comparative Example 12 | 33.3 | 33.3 |  | 33.3 | 0.09 |
| Comparative Example 13 | 25.0 |  | 25.0 | 50.0 | 4 |

4.2. Evaluation Tests

The following evaluation tests were performed using samples obtained in the following manner. First, an ink jet printer PX-B510 (manufactured by Seiko Epson Corporation) was modified such that a moving speed of a carriage of a recording head was able to be adjusted to 0.5 m/s or 0.3 m/s. Thereafter, an ink cartridge filled with the ink composition prepared in the above manner was mounted on the printer, and an image was recorded on a recording medium by discharging each ink composition from the nozzles of the recording head. The recorded matter in which an image was recorded in this manner was used as an evaluation sample.

Moreover, evaluation samples were prepared for each of low-speed recording (moving speed of carriage of 0.3 m/s) and high-speed recording (moving speed of carriage of 0.5 m/s). In addition, the recording conditions of an image were set to the duty of 100% and an image resolution of 360 dpi vertically×360 dpi horizontally.

The recording media used in manufacturing evaluation samples were as follows.

Photo paper for ink jet (trade name "Photo paper (gloss)", manufactured by Seiko Epson Corporation)
Plain paper 1 (trade name "Double-side high-quality plain paper", manufactured by Seiko Epson Corporation)
Plain paper 2 (trade name "Copy Plus Paper", manufactured by Hammermill papers)
Coated paper (trade name "OK Top Coat+", manufactured by Oji Paper Co., Ltd.)

4.2.1 Aggregation and Color Irregularity

Evaluation of image quality was performed on an evaluation sample obtained in the above manner by visually checking the state of aggregation and color irregularity of an image. The evaluation criteria were as follows.

⊙: At the position of 20 cm from the image recording surface, occurrence of color irregularity and aggregation was not observed.
○: At the position of 20 cm from the image recording surface, occurrence of color irregularity and aggregation was observed.
Δ: At the position of 100 cm from the image recording surface, occurrence of color irregularity and aggregation was observed.
X: At the position of 200 cm from the image recording surface, occurrence of color irregularity and aggregation was observed.

4.2.2. Bleed (Bleed Between K-Y Colors)

In the bleed test, evaluation of image quality was performed by visually checking an occurrence state of bleeding at the boundary portion between images recorded by both inks after recording an image pattern in which yellow ink (Y) and black ink (K) were adjacent. The evaluation criteria were as follows.

⊙: At the position of 20 cm from the image recording surface, bleed was not observed.
○: At the position of 20 cm from the image recording surface, bleed was observed.
Δ: At the position of 100 cm from the image recording surface, bleed was observed.
X: At the position of 200 cm from the image recording surface, bleed was observed.

4.2.3. Fixing (Friction Test)

The fixability of an image was evaluated by visually checking a contamination state of the image after rubbing the image of an evaluation sample obtained in the above manner with a finger twice. The evaluation criteria were as follows.

⊙: At the position of 20 cm from the image recording surface, contamination of an image was not observed.
○: At the position of 20 cm from the image recording surface, contamination of an image was observed.
Δ: At the position of 100 cm from the image recording surface, contamination of an image was observed.
X: At the position of 200 cm from the image recording surface, contamination of an image was observed.

4.3. Evaluation Results

The above evaluation results are shown in Table 2.

TABLE 2

| | Evaluation result High speed recording evaluation (relative speed of head and recording medium of 0.5 m/s) | | | | | | |
|---|---|---|---|---|---|---|---|
| | Aggregation and color irregularity | | | | Bleed between K-Y colors | Fixability (friction test) | |
| | Photo paper for ink jet | Plain paper 1 | Plain paper 2 | Coated paper | Coated paper | Plain paper 1 | Coated paper |
| Example 1 | ⊙ | ⊙ | ⊙ | ○ | ⊙ | ⊙ | ○ |
| Example 2 | ⊙ | ⊙ | ⊙ | ○ | ⊙ | ⊙ | ○ |
| Example 3 | ⊙ | ⊙ | ⊙ | ○ | ⊙ | ⊙ | ○ |

TABLE 2-continued

| | | | | | | | |
|---|---|---|---|---|---|---|---|
| Example 4 | ⊙ | ⊙ | ⊙ | ○ | ⊙ | ⊙ | ○ |
| Example 5 | ○ | ○ | ○ | ○ | ○ | ○ | Δ |
| Example 6 | ○ | ○ | ○ | ○ | ○ | Δ | ○ |
| Example 7 | Δ | ○ | ○ | Δ | Δ | Δ | Δ |
| Example 8 | Δ | ○ | ○ | Δ | Δ | Δ | Δ |
| Example 9 | Δ | ○ | ○ | Δ | Δ | Δ | Δ |
| Example 10 | Δ | ○ | ○ | Δ | Δ | Δ | Δ |
| Example 11 | ○ | ○ | ○ | ○ | Δ | ○ | ○ |
| Comparative Example 1 | Δ | ○ | Δ | X | X | X | X |
| Comparative Example 2 | Δ | ○ | Δ | X | X | X | X |
| Comparative Example 3 | Δ | ○ | Δ | X | X | X | X |
| Comparative Example 4 | Δ | ○ | Δ | X | X | X | X |
| Comparative Example 5 | Δ | ○ | Δ | X | X | X | X |
| Comparative Example 6 | Δ | ○ | Δ | X | X | X | X |
| Comparative Example 7 | Δ | ○ | Δ | X | X | X | X |
| Comparative Example 8 | Δ | ○ | Δ | X | X | X | X |
| Comparative Example 9 | Δ | ○ | Δ | X | X | X | X |
| Comparative Example 10 | Δ | ○ | Δ | X | X | X | X |
| Comparative Example 11 | Δ | ○ | Δ | X | X | X | X |
| Comparative Example 12 | Δ | ○ | Δ | X | X | X | X |
| Comparative Example 13 | Δ | ○ | Δ | X | X | Δ | Δ |

Evaluation result
Low speed recording evaluation (relative speed of head and recording medium of 0.3 m/s)

| | Aggregation and color irregularity | | | | Bleed between K-Y colors | Fixability (friction test) | |
|---|---|---|---|---|---|---|---|
| | Photo paper for ink jet | Plain paper 1 | Plain paper 2 | Coated paper | Coated paper | Plain paper 1 | Coated paper |
| Example 1 | ⊙ | ⊙ | ⊙ | ○ | ⊙ | ⊙ | ○ |
| Example 2 | ⊙ | ⊙ | ⊙ | ○ | ⊙ | ⊙ | ○ |
| Example 3 | ⊙ | ⊙ | ⊙ | ○ | ⊙ | ⊙ | ○ |
| Example 4 | ⊙ | ⊙ | ⊙ | ○ | ⊙ | ⊙ | ○ |
| Example 5 | ○ | ○ | ○ | ○ | ○ | ○ | Δ |
| Example 6 | ○ | ○ | ○ | ○ | ○ | Δ | ○ |
| Example 7 | ○ | ○ | ○ | ○ | ○ | ○ | ○ |
| Example 8 | ○ | ○ | ○ | ○ | ○ | ○ | ○ |
| Example 9 | ○ | ○ | ○ | ○ | ○ | ○ | ○ |
| Example 10 | ⊙ | ⊙ | ⊙ | ○ | ○ | ○ | ○ |
| Example 11 | ⊙ | ⊙ | ⊙ | ⊙ | Δ | ○ | ○ |
| Comparative Example 1 | Δ | ○ | Δ | Δ | X | Δ | X |
| Comparative Example 2 | Δ | ○ | Δ | Δ | X | Δ | X |
| Comparative Example 3 | Δ | ○ | Δ | Δ | X | Δ | X |
| Comparative Example 4 | Δ | ○ | Δ | Δ | X | Δ | X |
| Comparative Example 5 | Δ | ○ | Δ | Δ | X | Δ | X |
| Comparative Example 6 | Δ | ○ | Δ | Δ | X | Δ | X |
| Comparative Example 7 | Δ | ○ | Δ | Δ | X | Δ | X |
| Comparative Example 8 | Δ | ○ | Δ | Δ | X | Δ | X |
| Comparative Example 9 | Δ | ○ | Δ | Δ | X | Δ | X |

TABLE 2-continued

| | | | | | | | |
|---|---|---|---|---|---|---|---|
| Comparative Example 10 | Δ | ○ | Δ | Δ | X | Δ | X |
| Comparative Example 11 | Δ | ○ | Δ | Δ | X | Δ | X |
| Comparative Example 12 | Δ | ○ | Δ | Δ | X | Δ | X |
| Comparative Example 13 | Δ | ○ | Δ | Δ | X | Δ | Δ |

As the evaluation results in Table 2, it was shown that by using the ink composition which contains three or more kinds of acetylene glycol-based surfactant having the specific structure, more specifically, contains 0.1% by mass to 3% by mass thereof, even in either of a case of low-speed recording or high-speed recording, an image with excellent image quality and fixability can be obtained on various types of recording media.

In contrast, since the ink compositions according to Comparative Examples 1 to 11 did not contain three or more kinds of acetylene glycol-based surfactant having the specific structure, with low-speed recording, it was observed that image quality and fixability with respect to coated paper having low absorbability of ink tended to deteriorate, and with high-speed recording, it was observed that image quality and fixability with respect to coated paper deteriorated, and fixability with respect to plain paper deteriorated.

In addition, though the ink composition according to Comparative Example 12 contained three or more kinds of acetylene glycol-based surfactant having the specific structure, the content was less than 0.1% by mass. For this reason, it was shown that the effect of acetylene glycol-based surfactant having the specific structure was not sufficiently exhibited, and the results of respective evaluation tests had a tendency similar to the ink composition used in Comparative Examples 1 to 11.

Though the ink composition according to Comparative Example 13 contained three or more kinds of acetylene glycol-based surfactant having the specific structure, the content thereof was greater than 3% by mass. In a case of using the ink composition according to Comparative Example 13, with low-speed printing, it was shown that occurrence of bleed with respect to coated paper became significant, and with high-speed printing, it was shown that occurrence of bleed with respect to coated paper became significant, and occurrence of aggregation and color irregularity also became significant.

The invention is not limited to the above-described embodiments and various modifications are possible. For example, the invention includes substantially the same configuration (for example, a configuration in which functions, methods, and results are the same or a configuration in which the purposes or effects are the same) as the configuration described in the embodiments. Further, the invention includes a configuration in which a part which is not substantial in the configuration described in the embodiments is replaced. In addition, the invention includes configurations exhibiting the same action effects as the configurations described in the embodiments or configurations capable of achieving the same object. In addition, the invention includes a configuration produced by adding a known technology to the configuration described in the embodiments.

The entire disclosure of Japanese Patent Application No. 2013-267592, filed Dec. 25, 2013 is expressly incorporated by reference herein.

What is claimed is:

1. An ink composition for ink jet recording, comprising:
water;
a coloring material; and
three or more kinds of acetylene glycol-based surfactant selected from the group consisting of acetylene glycol represented by the following general formula (1), and an ethylene oxide adduct of acetylene glycol represented by the following general formula (2),
wherein a total content of the acetylene glycol-based surfactant is 0.1% by mass to 3% by mass with respect to the total mass of the ink composition

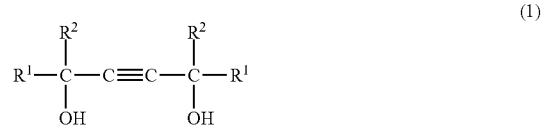

(in the general formula (1), each of $R^1$ and $R^2$ independently represents an alkyl group having 1 to 5 carbon atoms)

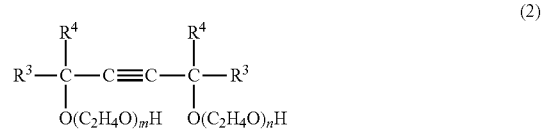

(in the general formula (2), each of $R^3$ and $R^4$ independently represents an alkyl group having 1 to 5 carbon atoms, each of m and n independently represents an integer of 0.5 to 25, and m+n is 1 to 40),
wherein the acetylene glycol-based surfactant includes one or more kinds of acetylene glycol represented by the above general formula (1) and two or more kinds of ethylene oxide adduct of acetylene glycol represented by the above general formula (2).

2. The ink composition according to claim 1, wherein all of the following formulas (A), (B), and (C) are satisfied in a case where, among the acetylene glycol-based surfactants, a HLB value of a first acetylene glycol-based surfactant is defined as $h_1$, the HLB value of a second acetylene glycol-based surfactant is defined as $h_2$, and the HLB value of a third acetylene glycol-based surfactant is defined as $h_3$ $$h_1 < h_2 < h_3 \tag{A}$$

$$h_1 < 6 \tag{B}$$

$$10 \leq h_3 \tag{C}$$

3. The ink composition according to claim 1, wherein each content of three or more kinds of the acetylene glycol-based surfactant is 5% by mass or greater and less than 50% by mass with respect to the total content of the acetylene glycol-based surfactant.

4. The ink composition according to claim 2, wherein a ratio of the content of the first acetylene glycol-based surfactant, the content of the second acetylene glycol-based surfactant, and the content of the third acetylene glycol-based surfactant is in a range of 3:1:1 to 1:1:1.

5. The ink composition according to claim 1, which is used in an ink jet recording method for recording an image by adhering the ink composition discharged from a recording head on a recording medium while relatively moving the recording head with respect to the recording medium at a high speed of 0.5 m/s or greater.

* * * * *